United States Patent [19]

Kitamura

[11] Patent Number: 4,489,361
[45] Date of Patent: Dec. 18, 1984

[54] HORIZONTALLY COMPACT SUBSTATION

[75] Inventor: Hiroaki Kitamura, Nishinomiya, Japan

[73] Assignee: Mitsubishi Denki Kabushiki Kaisha, Tokyo, Japan

[21] Appl. No.: 438,253

[22] Filed: Nov. 1, 1982

[30] Foreign Application Priority Data

Nov. 12, 1981 [JP] Japan .................. 56-168953[U]

[51] Int. Cl.³ .................................... H02B 5/04
[52] U.S. Cl. .................. 361/333; 200/50 AA; 361/268
[58] Field of Search .......... 200/50 R, 50 AA, 48 R, 200/51 R; 336/105; 174/18; 361/38, 268, 331, 332, 333, 335, 341, 376, 334

[56] References Cited

U.S. PATENT DOCUMENTS 3,488,563  1/1970  Caruthers ................... 361/268
4,258,410  3/1981  Boersma ...................... 336/105

OTHER PUBLICATIONS

"Mitsubishi Super Mobile Substations"—Aug. 1981.

Primary Examiner—G. P. Tolin
Attorney, Agent, or Firm—Leydig, Voit, Osann, Mayer and Holt, Ltd.

[57] ABSTRACT

This invention deals with a substation in which one terminal of a breaker which consists of breaking sections elevationally contacted and separated is electrically connected to a transformer, said breaker is contained in an insulator which is substantially vertically arranged, the lower portion of said insulator is mechanically connected to the tank of said transformer, and a connecting terminal which is electrically connected to the other terminal of said breaker is securely fixed onto the upper portion of said insulator.

1 Claim, 2 Drawing Figures

HORIZONTALLY COMPACT SUBSTATION

BACKGROUND OF THE INVENTION

This invention relates to a substation.

Recently, it has been regarded as being important to compactly construct substations of both stationary and movable types so as to reduce the space needed for the substation and to alleviate the limits on its transportation.

FIG. 1 is a front view showing an example of a conventional substation. In FIG. 1, reference numeral 1 denotes a base, which is fixed on the ground or on a movable trailer. 2 denotes a transformer which is installed on base 1 and which has at its one end an externally connecting bushing 2a. 3 denotes a connecting conductor which is provided substantially horizontally at the other end of transformer 2 and which is insulated from a transformer tank, and which is connected to the coil (not shown) of the transformer 2. 4 denotes a cover which is fixedly secured at one end to the tank of the transformer 2 around the conductor 3 and which is open at the other end, 5 denotes an operating mechanism which is installed on the base 1 to drive a movable contact 8 of a breaker 9, which will be described later in detail, 6 denotes a metallic tank which is fixed vertically onto the top of the operating mechanism 5 and which has upper and lower openings 6a and 6b. 7 denotes a stationary contact which is secured within the upper portion of the tank 6, and 8 denotes a movable contact which is contacted with and separated from the contact 7 driven by the up and down motion of operating mechanism 5. The stationary and movable contacts 7 and 8 form a breaker 9. 10 denotes an externally connecting insulator which is fixedly secured to the upper opening 6a of the tank 6, and 11 denotes a connecting terminal which is supported by the insulator 10 and which is connected to the contact 7. 12 denotes an insulating spacer which closes the lower opening 6b of the tank 6, and 13 denotes a connecting conductor which passes through the spacer 12 and which is sealed from the spacer 12. 14 denotes a flexible contact which is connected between the conductors 3 and 13, and 15 denotes a flexible bellows which seals between the other end of the cover 4 and the lower opening 6b of the tank 6.

Since the terminal 11 which is connected to the stationary contact 7 is supported by the insulator 10 and is horizontally mounted in the above-mentioned conventional structure, this substation has no problem in regards to height limits when the substation is transported or moved on a trailer. However, the flaw can be said to be the large horizontal space.

SUMMARY OF THE INVENTION

This invention is to eliminate the above-mentioned flaws inherent in conventional substations, and its object is to provide a substation which can contain the contact section of a breaker in an insulator, which can mechanically connect the lower part of the insulator to a tank of the breaker, and which can provide the connecting terminal of the breaker at the stationary contact side directly to the upper portion of the insulator, thereby compactly reducing the space for the substation.

BRIEF DESCRIPTION OF THE DRAWINGS

In the drawings, the same reference numerals denote the same or equivalent parts and components.

DESCRIPTION OF THE PREFERRED EMBODIMENTS

Figure 1:
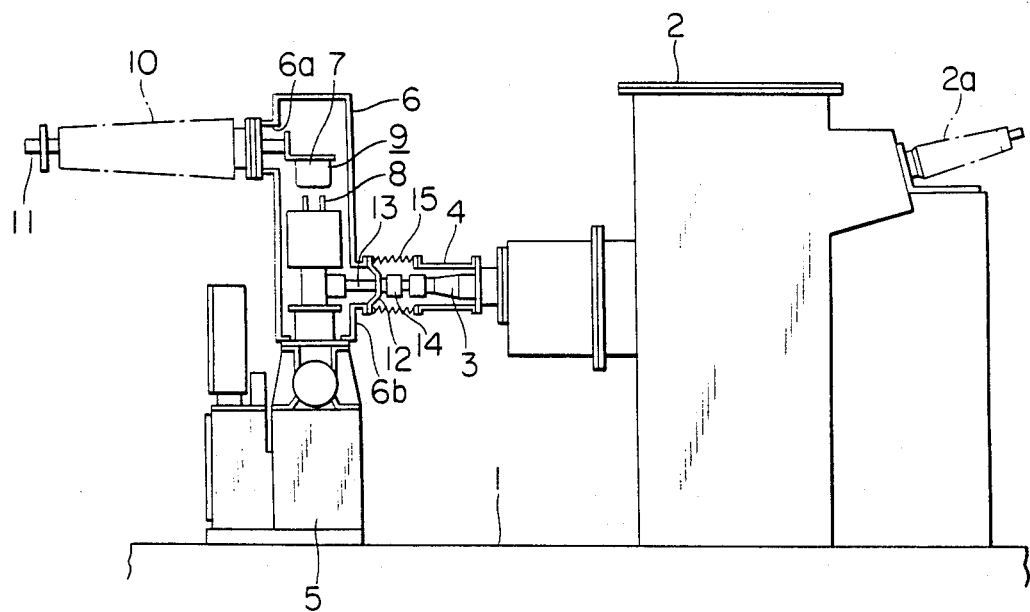
FIG. 1 is a front view showing a conventional substation.
Figure 2:
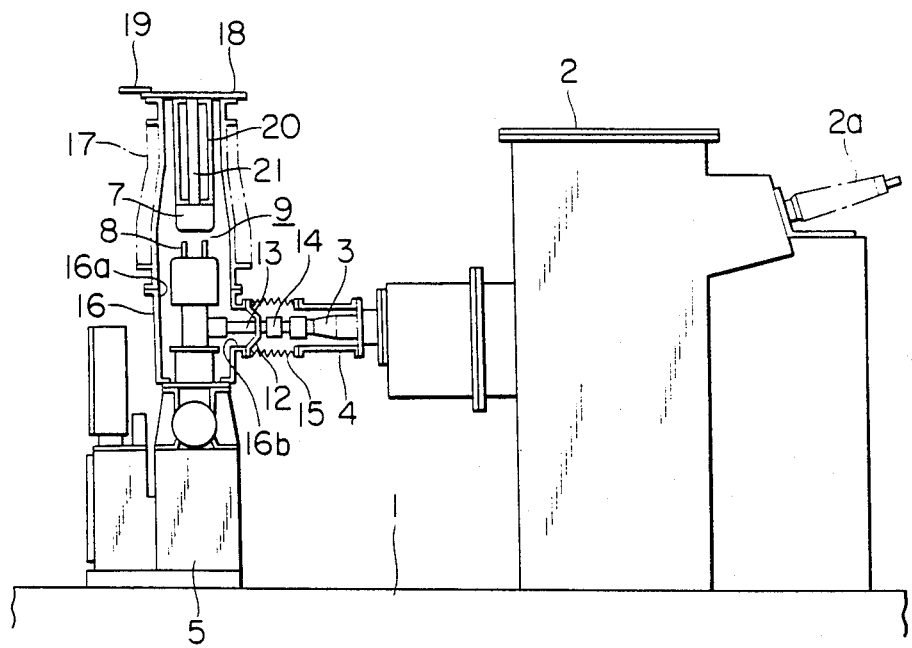
FIG. 2 is a front view showing an embodiment of a substation according to this invention.

In FIG. 2, reference numerals 1 to 5, 7 to 9 and 12 to 15 denote the same components as those which are denoted in the conventional substation in FIG. 1. Reference numeral 16 denotes a metallic tank which is fixed vertically onto the upper portion of the operating mechanism 5, and which accommodates an upper opening 16a and a lower opening 16b. An insulating spacer 12 closes the lower opening 16b of the tank 16. A movable contact 8 is constructed to project from the upper opening 16a of the tank 16. Reference numeral 17 denotes an insulator which is vertically fixed at its one end to the tank 16 so as to close the upper opening 16a of the tank 16, and which contains a breaker 9 that consists of both contacts 7 and 8. Reference numeral 18 denotes a conductive closing member which closes the other end of the insulator 17, 19 denotes a connecting terminal which is electrically and mechanically connected to the closing member 18, and 20 denotes a supporting member which is securely fixed at its one end to the closing member 18 and which supports at the other end the contact 7. Reference numeral 21 denotes a connecting conductor which electrically connects the stationary contact 7 to the closing member 18.

According to this invention, the vertical breaker which is connected to the transformer is contained in the vertical insulator, and the connecting terminal is fixedly connected to the upper portion of the insulator, thereby supporting the connecting terminal by the insulator. Consequently, the horizontal projecting portion of the substation can be reduced in length, resulting in a reduced installation area.

The above-mentioned embodiment of the substation may also be employed for a stationary ground substation or a movable substation carried on a trailer.

What is claimed is:
1. A substation comprising
   a metallic tank,
   an insulator mounted on said tank and extending substatially vertically above a lower portion of said tank,
   a circuit breaker having breaking sections accomodated within said insulator and said tank, said sections breaking upon relative vertical movement,
   a transformer mechanically connected to a lower portion of said metallic tank, and electrically connected to a lower terminal of said circuit breaker, and
   a connection terminal secured to an upper portion of said insulator and electrically connected to an upper terminal of said circuit breaker.

* * * * *